April 15, 1969 A. L. HANDMAN 3,438,576
VISIBILITY MODIFICATION METHOD AND APPARATUS
Filed Oct. 10, 1966 Sheet 1 of 2

INVENTOR.
ARTHUR L. HANDMAN
BY *C. E. Martine, Jr.*
Attorney

INVENTOR.
ARTHUR L. HANDMAN

3,438,576
Patented Apr. 15, 1969

3,438,576
VISIBILITY MODIFICATION METHOD AND APPARATUS
Arthur L. Handman, St. Paul, Minn., assignor to Litton Systems, Inc., Beverly Hills, Calif.
Filed Oct. 10, 1966, Ser. No. 585,390
Int. Cl. E01h *13/00;* A01g *15/00*
U.S. Cl. 239—2                                13 Claims

ABSTRACT OF THE DISCLOSURE

Method and apparatus for visibility modification including a pulse jet engine having an electrode disposed in axial relation within the exhaust pipe so that in operation, the engine produces a cycling, reversing flow of hot ionized gases, the electrode withdraws ions of a given polarity to produce uni-polar ions which are discharged in a pulsating flow with hot gases into the surrounding atmosphere to subject particles in the atmosphere to electrical, thermal and sonic forces to modify the visibility of the atmosphere.

---

This invention relates to visibility modification apparatus and methods and more particularly to an effective visibility modification system and process in which selected ions of a pulsating, flowing plasma are discharged into the atmosphere.

Atmospheric conditions, such as fog and smoke, are sometimes effective to reduce visibility to such an extent that automobile traffic becomes hazardous and airports must be closed. Published literature dating as far back as 1930, indicates that such atmospheric conditions have prompted a long series of experiments in an endeavor to artificially modify visibility through the atmosphere.

Many of these experiments have related to attempts to increase visibility by dissipating fog. Fog has been described as being a suspension of minute water droplets in air, wherein the water content is about 0.2 gram per cubic meter of air. Alternatively, fog has been characterized by the presence of from 10 to 100 water droplets per cubic centimeter, where the droplets are from 1 to 60 microns in diameter. Fog is said to be either warm, when the droplet temperature is greater than or equal to 0° C., or supercooled, when the temperature of the droplets is less than 0° C.

Ordinarily, fog dissipates naturally by evaporation, but considerable time is required for this natural process to occur. On the other hand, artificial dissipation may occur by causing the minute water droplets to coalesce and form large droplets which precipitate to the ground under the action of gravity. The present invention is directed toward such artificial dissipation by a method which may be performed using relatively small, simple, effective and inexpensive systems.

The prior experiments utilized a wide variety of apparatus and methods ranging from the modified World War II FIDO installations in which fuel was fed through nozzles and burned at a rate of over thirty-two thousand gallons per hour, to electrical sweep-out methods in which falling, charged particles were intended to electrostatically attract airborne particles and remove them from the air. A study of these experiments indicates that prior efforts examined the effect on fog of individual fog dispersal mechanisms. Thus, the FIDO experiments studied the effects of heat alone, others studied pure electrostatic attraction, while others studied pure electrostatic percipitation. The general conclusions reached in the prior publications were that the fog-dispersal mechanisms studied were not adequate or effective and that no methods or equipment have been developed, which are portable, reasonably inexpensive and effective to artificially modify visibility by dissipating fog.

Research conducted in an endeavor to provide simple, inexpensive and effective methods and systems for artificially modifying visibility indicates that fog may be effectively dissipated by a method which combines the action of a number of forces on the water droplets of the fog. By this method, a resonant, pulsating flow of hot, uni-polar ionized gases is projected into a volume characterized by low visibility due to the presence of fog, for example. The resonance of the uni-polar, ionized gases produces sonic waves which contribute to fog dissipation by causing the droplets to collide and coalesce. Further, the ionized gases projected into the volume create a space charge and a resulting electric field which promotes coalescence. Also, polarization on non-charged water droplets will force the droplets in the direction of increased electric field, i.e., to the ground. In addition to sonic and electrical forces, the ionized gases are projected in a heated condition which is sufficient to evaporate local fog within ten-foot range. The heated condition of the gases is also effective to carry the space charge upwardly so that the electrical effects will operate over a greater volume.

Accordingly, it is an object of the present invention to provide a new and improved visibility modification apparatus and method.

Another object of the present invention resides in a method of visibility modification in which electrical, thermal and sonic forces act in combination to dissipate water droplets and other atmospheric particles which reduce visibility.

Still another object of the present invention is to provide an efficient and mobile apparatus which produces a resonant, hot stream of uni-polar, ionized gases for modifying visibility.

A further object of the present invention resides in the provision of small, efficient, and portable pulse jet dissipators in combination with an ion collector for producing a resonant, hot stream of uni-polar, ionized gases for modifying visibility by dissipating fog.

The above-mentioned objects of the present invention are achieved through the use of a device known as a pulse jet engine. Such engines have been known in the aircraft industry for many years. These engines consist of a combustion chamber, an inlet pipe, and an exhaust pipe. Though structurally quite simple, the design and operation of these engines depends upon precise control of critical design parameters. These engines, at least in their valveless forms, have no moving parts, and once started, continue operating in a resonant manner until their fuel supply is cut off. The engines are started by supplying fuel, compressed air, and a spark to the combustion chamber. The fuel and air mixture explodes, creating hot, flaming, plasma gases which include both positive and negative ions. The gases are driven out of both the inlet and exhaust pipes of the engine. The explosion causes an overexpansion in the combustion chamber, which results in a partial vacuum in the combustion chamber after the explosion. This partial vacuum causes a fresh supply of air to be drawn in through the inlet pipe and part of the hot exhaust gases to be drawn back from the exhaust pipe into the combustion chamber. More fuel is injected into the combustion chamber, and the hot exhaust gases drawn back into the chamber provide the heat to ignite the new mixture of air and fuel. It is thus seen that continued operation requires no spark or compressed air to maintain operation with no moving parts until such time as the fuel supply is cut off. It is also seen that there is an oscillating or pulsating supply of hot gases in the exhaust pipe which is continuously reversing direction at the resonant or operating frequency of the engine.

In accordance with the foregoing and other objects of the present invention, apparatus for modifying visibility may include a pulse jet dissipator utilizing a pulse jet engine, such as described above. An ion collector is provided in and extends out of the exhaust pipe of the engine. The ion collector is electrically connected as an anode to a high voltage power supply for collecting ions of one sign. As a result, the pulsating, hot gases driven out of the exhaust pipe include uni-polar ions which are projected into the low visibility volume adjacent the engine. The hot, ionized, uni-polar gases produce a space charge and a resulting electric field in the atmosphere adjacent the exhaust pipe which promotes coalescence of water droplets. In addition, the sonic waves produced by the pulsating, hot, uni-polar gases further promote collision and coalescence. The hot gases rise and extend away from the exhaust pipe so that the enhanced electric field is established over an area of about 800 square yards and to a height of about 40 yards or more, depending on thermal stability.

These and other objects of the present invention will become apparent and a complete understanding of the present invention may be had by referring to the following detailed description and the accompanying drawings which illustrate a preferred embodiment thereof, in which.

Figure 1:
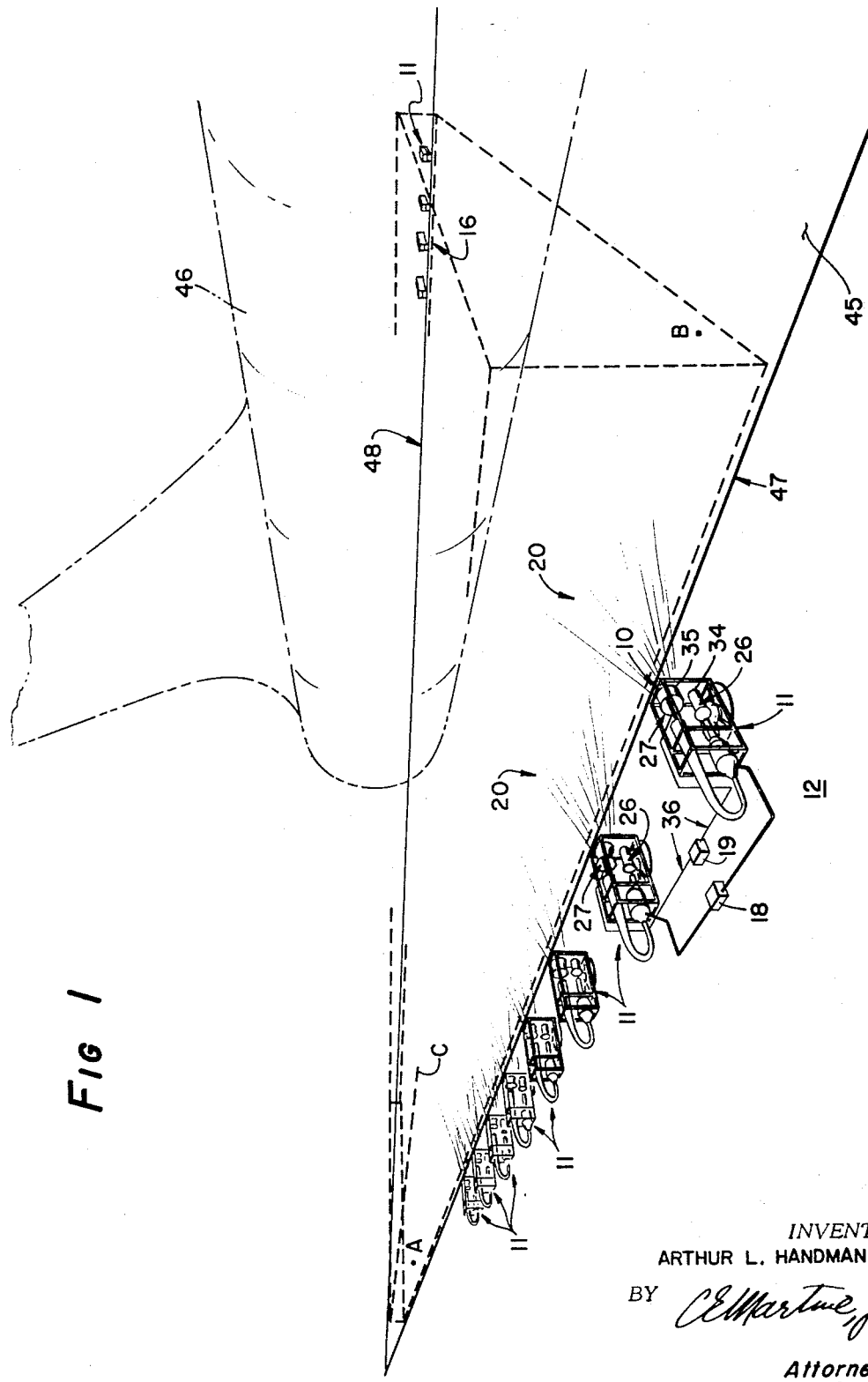
FIG. 1 is a perspective view of an arrangement of pulse jet dissipators which may be used to perform the method of the present invention.

Referring now in general to the drawings, FIG. 1 shows a perspective view of a system operating according to the method of the present invention for modifying the visibility from location A to location B within a volume defined in the atmosphere by dashed lines C. A first series 10 of pulse jet dissipators 11 is shown mounted on the ground or other terrain 12 opposite to a second series 16 of pulse jet dissipators 11. A suitable fuel, such as propane, is supplied to the dissipators 11 from a source 18. Also, a high voltage power is provided to the dissipators 11 from a power supply 19. In operation, the dissipators 11 are effective to produce hot, pulsating, ionized, uni-polar gases 20 which are expelled into the atmosphere in the volume C for increasing the visibility from location A to location B, for example.

Figure 2:
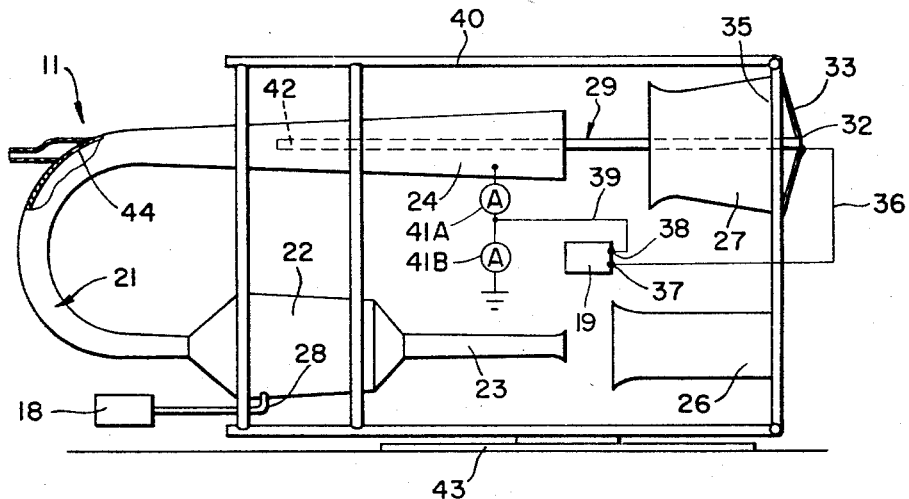
FIG. 2 is an elevational view of one of the pulse jet dissipators shown in FIG. 1.
Figure 3:
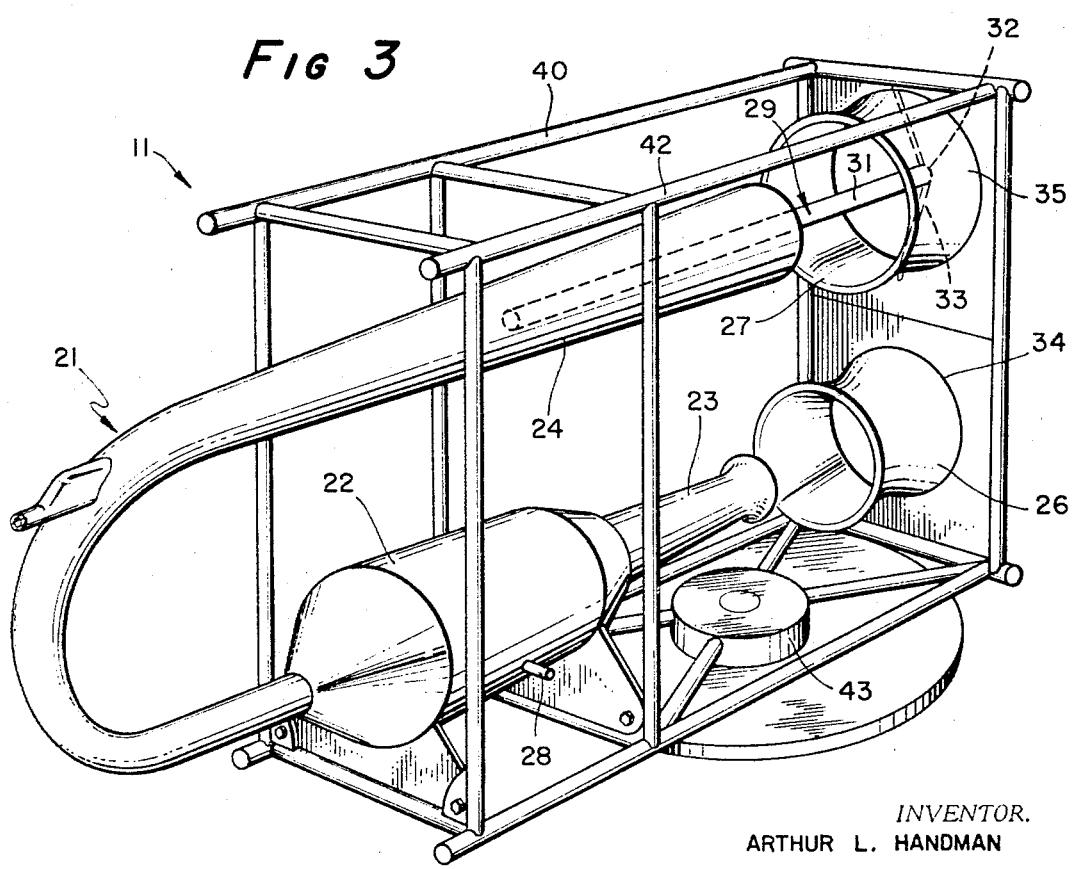
FIG. 3 is a perspective view of one of the pulse jet dissipators shown in FIGS. 1 and 2.

Directing attention to FIG. 2, a pulse jet engine 21 which is used in the dissipators 11 is shown including a combustion chamber 22, an inlet pipe 23, an exhaust pipe 24, a first augmenter 26 and a second augmenter 27. As shown in FIG. 2, the exhaust pipe 24 is bent substantially 180° so that the direction of its exhaust is essentially parallel to the axis of the first augmenter 26. With the exception of the second augmenter 27, the pulse jet engine 21 is conventional in the aircraft industry. It has been determined that a pulse jet engine 21 suitable for use in fabricating the dissipators 11 may have an overall length of approximately 40 inches and a height of 30 inches from the bottom of the first augmenter 26 to the top of the second augmenter 27.

The first augmenter 26 serves to increase the flow of air therethrough by a factor of 15 to 20 over the output from the inlet pipe 23. To minimize leakage of current from the exhaust gases to ground via the second augmenter 27, the second augmenter is electrically insulated from the remainder of the dissipator 11. It is noted that although the pipe 23 is called the inlet pipe and the pipe 24 the exhaust pipe, substantially equal volumes of hot exhaust gases are emitted through each pipe. However, because the inlet pipe 23 is substantially shorter than the exhaust pipe 24, during each cycle of operation of the engine, the output pulse of exhaust gases completely clears the end of the inlet pipe 23, but is still partially contained in the longer exhaust pipe 24. When the over expansion of gases caused by an explosion in the combustion chamber 22 results in a partial vacuum in the combustion chamber, fresh air is drawn back into the chamber through the inlet pipe 23 and that part of the exhaust gases remaining in the exhaust pipe 24 is drawn back. Fuel is injected into the combustion chamber 22 by a suitable fuel line 28. The fuel mixes with the fresh air drawn in through the inlet pipe 23 and is exploded by the hot gases drawn back through the exhaust pipe 24, thereby repeating the operational cycle of the engine 21.

Still referring to FIG. 2, the dissipator 11 includes the pulse jet engine 21 and the second augmenter 27. In addition, an ion collector 29 is provided in combination with the engine 21. The ion collector 29 includes an electrode, such as an anode 31, mounted within and extending beyond the exit end of the exhaust pipe 24 into the second augmenter 27. In a preferred embodiment of the pulse jet dissipators 11, the anode 31 is formed from a ¼ inch diameter tungsten rod, which is approximately eighteen inches long. The anode or rod 31 is supported at the right end 32 thereof by a stainless steel bracket 33. The same end 32 of the rod 31 extends through the second augmenter 27 and terminates approximately in a plane formed by the end 35 of the second augmenter 27. The anode 31 is connected to a conductor 36 which is supplied from a first terminal 37 of the high voltage power supply 19. A second terminal 38 is connected to a conductor 39 which is electrically secured to the exhaust pipe 24 through an ammeter 41a. In an operational dissipation system using the pulse jet dissipator 11, the power supply 19 has an output of about 5 kv. at 4 ma., for example, as indicated by the ammeter 41a.

As shown in FIG. 2, the pulse jet dissipator 11 may be supported by a heat resistant frame 40 which is mounted for rotation on a base 43 which is electrically insulated from the ground 12. Rotation of the pulse jet dissipator 11 permits the hot, pulsating, uni-polar, ionized exhaust gases to be selectively directed to compensate for the direction of the wind, for example.

In the system referred to above, the fuel supplied to the pulse jet engine 21 was propane gas. It is preferable to use such fuels as gasoline, diesel oil or propane gas because they are readily available, relatively inexpensive and have a relatively high B.t.u. content per pound. With such high heat producing capacity fuels, the pulse jet dissipator 11 is capable of producing from 1,000,000 to 4,000,000 B.t.u./hr., while occupying a small space, such as forty inches in length, by 12 inches in width, by 30 inches in height.

The fuel is exploded cyclically in the combustion chamber 22, at a resonant frequency of about 150 cycles per second in the operational dissipation system. It may be recalled that the exhaust gases from the combustion chamber are in the form of plasma gases, including negative ions, positive ions and neutral gas atoms. The rapid explosions in the combustion chamber 22 pulsate the plasma gases back and forth in the exhaust pipe 24 and produce a net flow out of the end of the exhaust pipe 24. The temperature of the plasma gases may be about 3000° F. within the U-shaped portion of the exhaust pipe 24, and, because the second augmenter 27 supplements the flow of exhaust gases through it with about 15 to 20 times as much fresh air, the temperature of the gases discharged from the second augmenter 27 is about 200° to 300° F.

While the theory of operation of the rod 31 in the exhaust pipe 24 is not known, it is believed to be as follows. The resistivity of the hot plasma increases with increasing distance from the combustion chamber 22 such that at a point along the exhaust pipe 24, the resistivity becomes sufficiently high, such as approximately $2 \times 10^{11}$ to $2 \times 10^{13}$ ohms, to permit an electric field to be established in the plasma gases. The left end 42 of the rod 31 is located at such point and extends therefrom to the right toward the end of the pipe 24. A positive, for example, 5 kv. potential between the anode 31 and the exhaust pipe 24 establishes the electric field which is generally radial and extends from the axis of the exhaust pipe 24 to the walls of the exhaust pipe, the strength of the field varying as the diameter of the exhaust pipe 24 increases. The strength of the field is less than that required to ionize the exhaust gases because the plasma gases are already in an ionized condition as the exhaust flows from the combustion chamber 22. As the plasma gases pulsate violently in the electric field, a substantial proportion of the negative ions are attracted to the rod 31 whereas the positive ions are repelled toward the walls of the exhaust pipe 24. The violent turbulence and pulsation of the plasma gases prevents a substantial proportion of the positive ions from reaching the walls of the exhaust pipe 24, so that a substantial number of positive, hence uni-polar, ions are discharged from the end of the exhaust pipe 24 along with the neutral exhaust gases to form the hot, pulsating, uni-polar ionized exhaust gases. In a preferred embodiment, the pulse jet dissipator 11 had a one million B.t.u. per hour capacity and operated at a resonant frequency of 150 cycles per second and with the 5 kv. power supply 19. With this operation, the hot, pulsating, uni-polar, ionized exhaust was discharged from the second augmenter 27 at a rate of 3000 cubic feet per minute to provide 0.74 microampere ionic current as indicated by an ammeter 41b connected between the second terminal 38 and ground. Coupled with the relatively high temperature of the pulsating, ionized, uni-polar exhaust gases, and the substantial ionic current of such gases, there is an extremely high level noise output of the pulse jet dissipator 11. This output noise level may be as high as 120 db. within 20 feet of the second augmenter 27 and contributes to collision and coalescence of the water droplets of the fog.

The one-million B.t.u. per hour capacity embodiment of the pulse jet dissipators 11 has been utilized to dissipate artificial fog which closely simulated natural fog conditions in a test range. The test range included a shallow gulley which was about 40 feet deep, 300 feet across and over 600 feet long. A transmissometer was set up at a height of 12 feet above ground level in the gulley and indicated approximately a six mile visibility under clear conditions over a 500 foot line of measurement distance down the length of the gulley. Generated fog was directed into the gulley and filled from about 50-75 feet of the length of the 500 foot line of measurement of the transmissometer to an altitude of 40 feet. The fog generator was maintained in operation to represent movement of fog into the test area as a result of natural convection and wind. With such fog conditions, the transmissometer recorded an approximate visibility of one quarter of a mile.

The pulse jet dissipation 11 was positioned at an angle relative to the length of the gulley so that the axes of the pipes 23 and 24 were directed toward the fog in the gulley. With the power supply 19 energized and the combustion chamber 22 supplied with propane fuel at a rate of 30 gallons per hour, the fog was dissipated under the combined action of the electrical, thermal and sonic forces produced by the hot, pulsating, uni-polar, ionized gases discharged by the dissipator 11. The transmissometer indicated that within 1 minute, the fog was dissipated by the pulse jet dissipator 11 to approximately a 2-3 mile visibility.

In addition to the use of the transmissometer, droplet tests were conducted prior to the operation of the dissipator 11. Cardboard squares having an area of approximately 15 sq. inches were held vertically about 15 feet downstream from the fog generator and became slightly moist with only a few drops striking the exposed surface in 5 seconds. Similar squares were held in the same manner and position during the operation of the dissipator 11 and in the same 5 second period became dripping wet and covered with droplets of about 1 mm. in diameter.

As shown in FIG. 2, if it is desired to increase the ion current discharged by the pulsating, uni-polar, ionized, exhaust gases into the atmosphere, the dissipator 11 may be provided with an orifice 44 adjacent the U-shaped section of the exhaust pipe 24. An aerosolizable dielectric material, such as ethylene glycol, glycerine, or ethylene, may be pumped through the orifice 44 into the exhaust pipe 24.

Referring again to FIG. 1, it may be understood that the series 10 and 16 of the pulse jet dissipators 11 may be provided adjacent to a volume defined by the space above a surface, as, for example, by being provided on opposite sides of a volume such as that defined by an airport runway 45 which serves aircraft 46. Standard runways 45 have variable lengths, whereas the width for commercial aircraft is generally 200 feet and for military aircraft 300 feet. It may be understood that the length and width of such runways 45 define an area which, along with the minimum visibility altitude defines the dimensions of the volume shown by the dashed lines C. In such volume, the adverse atmospheric conditions, such as fog, must be modified to permit uninterrupted aircraft operation. The dissipators 11 may be arranged in seriatim along both sides 47 and 48 of the runway 45 and are mounted as shown in FIG. 1 with the discharge ends 34 and 35 of the first and second augmenters 26 and 27 approximately 25 feet from the sides 47 and 48 of the runway 45. Depending upon the exact operating characteristics of the dissipator 11, the fog dissipating jets of the hot, pulsating, ionized gases 20 will spread laterally and horizontally between about 50 to 75 feet, for example, as the hot, pulsating, uni-polar, ionized exhaust gases are propelled toward the runway 45. Accordingly, the dissipators 11 may be mounted on approximately 50 foot sonic waves from the hot, pulsating, uni-polar, ionized gases 20 will rise to heights of from 150 to 200 feet, depending upon atmospheric conditions, such as wind. The sonic waves from the hot, pulsating, uni-polar, ionized exhaust gases 20 discharged into the volume are effective to cause the water particles of the fog to collide and coalesce. In addition to the forces from the sonic waves, the thermal input to the volume from such gases 20 is effective to evaporate a portion of the fog. Combined with such thermal and sonic forces, such gases 20 are effective to create a space charge and a resulting electric field in the volume for promoting coalescence of the water droplets of the fog. The gases 20, hence the space charge, are urged upwardly as a result of the low density of the gases relative to the surrounding atmosphere, so that the space charge exists to the 150–200 foot altitude, depending upon wind and other conditions.

Because each of the dissipators 11 may be fabricated in an easily movable configuration, such as by providing insulating nylon wheels (not shown) on the bases 43, and is of a height less than the maximum 3 foot height of runway lights allowed adjacent to airport runways, the intended that the present invention be limited only by the the runways 45, and will be effective to dissipate the fog or visibility impairing condition existing in the volume C above the runway 45.

It is to be understood that the above-described arrangements are simply illustrative of the application of the principles of this invention. Numerous other arrangements may be readily devised by those skilled in the art which will embody the principles of the present invention and fall within the spirit and scope thereof. It is thus intended that the present invention be limited only by the scope of the appended claims.

What is claimed is:

1. The method of modifying a visibility condition produced by particles in the atmosphere, which comprises:

establishing a cycling, reversing flow of hot, ionized gases in a volume separate from said atmosphere;

withdrawing ions having a given polarity from said gases to produce uni-polar ions in said volume; and discharging a pulsating flow of said uni-polar ions and hot gases from said separate volume into said atmosphere to subject said particles to the combined effect of electrical, thermal and sonic forces produced by said pulsating flow.

2. The method of claim 1, in which:
said cycling, reversing flow and said discharging are established by injecting the exhaust gases of a pulse jet engine into said separate volume.

3. The method of claim 1, in which:
said visibility condition is fog and said electrical, thermal and sonic forces produce coalescence of the water droplets forming said fog to modify said visibility condition.

4. The method of dissipating fog, which comprises the steps of:

establishing a resonant, reversing flow of heated plasma in a pipe, wherein said flow tends to discharge opposite polarity ions of said plasma from said pipe; and selectively removing ions having one of said opposite polarities from said plasma so that substantially only ions having the other of said opposite polarities are discharged from said pipe into said fog.

5. The method of claim 4, in which:

said flow includes combustion gases discharged along with said other polarity ions; and said discharge of said resonant, reversing flow of gases and other polarity ions produces electrical, thermal and sonic forces on the water droplets of said fog to cause collision and coalescence of said droplets.

6. The method of claim 5, in which:

said resonant, reversing flow is established by directing the exhaust gases from a pulse jet engine into said pipe; and said selective removing is effected by subjecting said opposite polarity ions to an electric field established within said pipe.

7. The method of dissipating fog, which comprises:

establishing an electric field across an exhaust pipe of a pulse jet engine; and operating said pulse jet engine to exhaust through said electric field and out of said pipe a pulsating flow of hot, uni-polar, ionized gases for simultaneously applying electrical, sonic and thermal forces to said fog.

8. The method of dissipating fog according to claim 7, wherein said fog is in a volume defined by the atmosphere above a paved, two-dimensional surface, which includes:

mounting a series of said pulse jet engines along at least one side of said paved surface with the discharge ends of said pipes directed toward the volume defined above said surface, simultaneously establishing said electric fields across the exhaust pipes of said pulse jet engines of said series; and simultaneously operating said pulse jet engines of said series to dissipate said fog in said volume.

9. Apparatus for modifying visibility through the atmosphere, which comprises:
a pipe;

means for discharging through said pipe a cycling, reversing flow of hot plasma gases including ions of opposite polarity; and means for selectively removing said ions of one polarity from said plasma gases so that a resonant flow of substantially uni-polar ions and neutral gases discharges from said pipe into said atmosphere.

10. Apparatus in accordance with claim 9, in which:
said means for discharging is a pulse jet engine, and said pipe is the exhaust pipe of said pulse jet engine.

11. Apparatus for dissipating fog, which comprises:
a pipe;

means extending into said pipe for establishing an electric field in said pipe; and a pulse jet engine for discharging a cycling, reversing flow of plasma gases including ions of opposite polarity through said electric field;

said electric field being effective to preclude discharge into said fog of ions of said plasma gases having one of said opposite polarities.

12. Apparatus in accordance with claim 11, in which:

said establishing means includes a rod having a portion extending out of said pipe and a high voltage power supply connected between said rod and said pipe; and an annular means adjacent to the exit end of said pipe and surrounding said portion of said pipe for augmenting the flow of said gases out of said pipe, said annular means being electrically insulated from said pipe and said rod.

13. Apparatus for dissipating fog, which comprises:
a pulse jet engine including a combustion chamber, an air inlet pipe, an exhaust pipe, and means for producing periodic explosions within said combustion chamber so that exhaust plasma gases from said combustion chamber move rapidly back and forth in said exhaust tube and a portion of said gases are propelled from said exhaust pipe;
a first annular member electrically insulated from said pulse jet engine and having an axis aligned with the axis of said exhaust pipe, said first member being spaced from said exhaust pipe for augmenting said portion of gases discharged from said exhaust pipe;
a rod extending within both said exhaust pipe and said first member;
a high voltage power supply connected to said exhaust pipe and to said rod for establishing an electric field across said exhaust pipe and said first member so that said portion of said hot, pulsating gases discharged from said exhaust pipe is substantially uni-polar;

a second annular member axially aligned with and adjacent to said inlet pipe; and means for injecting an aerosolizable dielectric material into said exhaust pipe for increasing the ion current produced by the uni-polar ions in said portion of said gases discharged from said exhaust pipe.

References Cited

UNITED STATES PATENTS

| | | | |
|---|---|---|---|
| 1,363,037 | 12/1920 | Goddard. | |
| 1,928,963 | 10/1933 | Chaffee | 239—2 |
| 2,264,495 | 12/1941 | Wilner | 317—4 |
| 2,595,774 | 5/1952 | De Ment | 55—107 |
| 2,812,635 | 11/1957 | Le Foll et al. | 60—249 |
| 3,231,195 | 1/1966 | Bertin et al. | 239—2 |
| 3,297,281 | 1/1967 | Felici | 239—2 |

EVERETT N. KIRBY, *Primary Examiner.*

U.S. Cl. X.R.

239—14

U.S. DEPARTMENT OF COMMERCE
PATENT OFFICE
Washington, D.C. 20231

UNITED STATES PATENT OFFICE
CERTIFICATE OF CORRECTION

Patent No. 3,438,576                                                        April 15, Arthur L. Handman It is certified that error appears in the above identified patent and that said Letters Patent are hereby corrected as shown below:

Column 5, line 52, "dissipation" should read -- dissipator --. Colum 6, line 34, "sonic waves from" should read -- centers such that --; line 5 "intended that the present invention be limited only by the" should read dissipators 11 are especially suitable for use adjacent to --.

Signed and sealed this 14th day of April 1970.

(SEAL)
Attest:

Edward M. Fletcher, Jr.
Attesting Officer

WILLIAM E. SCHUYLER,
Commissioner of Pater